July 5, 1966  J. S. COOK  3,259,899
NONDEGENERATE MULTIMODE TRACKING SYSTEM
Filed Dec. 24, 1963  2 Sheets-Sheet 1

INVENTOR
J.S. COOK
BY
ATTORNEY

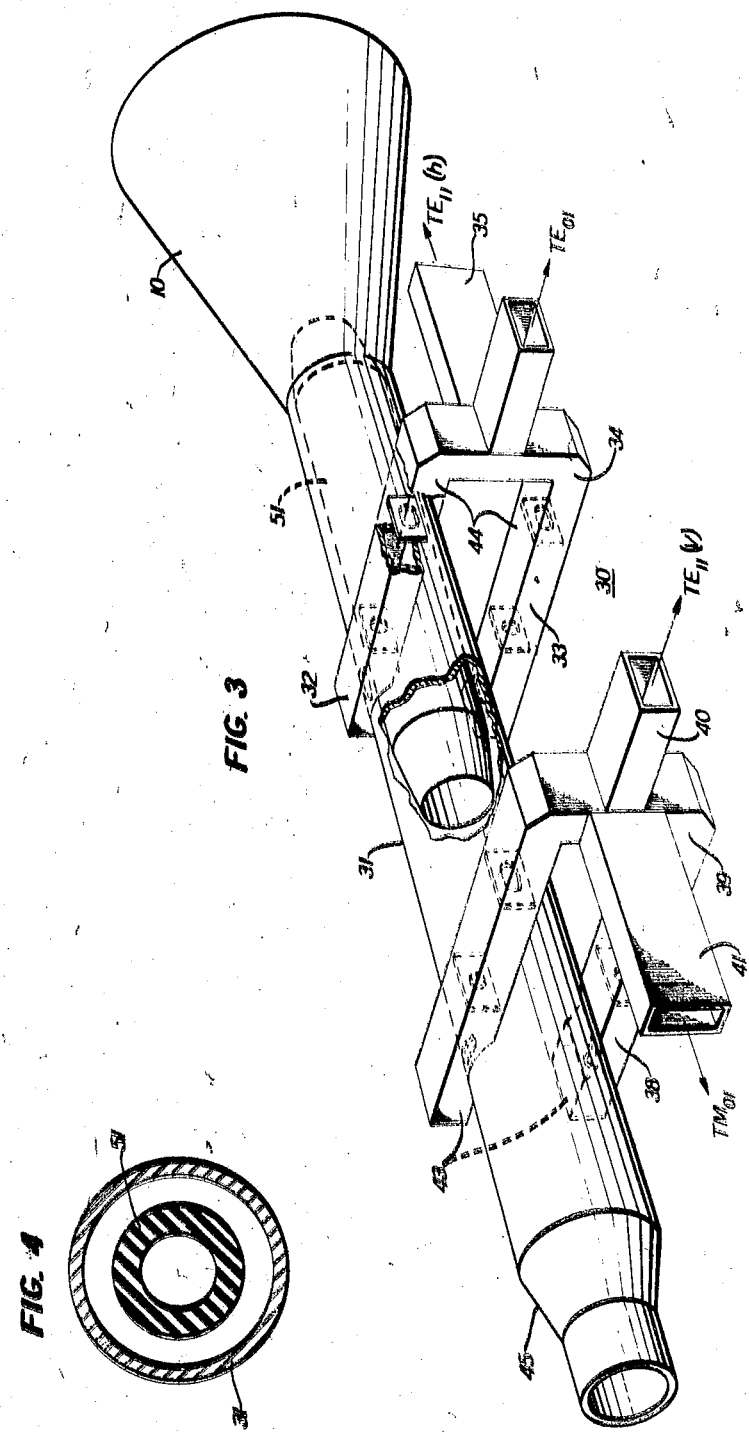

United States Patent Office 3,259,899
Patented July 5, 1966

3,259,899
NONDEGENERATE MULTIMODE TRACKING SYSTEM
John S. Cook, New Providence, N.J., assignor to Bell Telephone Laboratories, Incorporated, New York, N.Y., a corporation of New York
Filed Dec. 24, 1963, Ser. No. 333,103
15 Claims. (Cl. 343—113)

This invention relates to simultaneous lobing radar systems, and more particularly to radar tracking systems in which a plurality of difference modes excited by a circularly polarized microwave signal are analyzed at an antenna station to determine accurately the direction of arrival of the signal at the antenna location. It has for its object to avoid the effects of polarization degeneracy and to insure that a linearly polarized signal may be unambiguously tracked.

In simultaneous lobe comparison radar systems, the so-called monopulse systems, tracking of a target is accomplished by comparing overlapping pattern or lobe signals returned to the antenna, and determining from this examination the discrepancy, if any, between the direction the antenna is pointing and the actual direction of the target. The discrepancy is reduced to a set of pointing-error signals which may be used either as a vernier correction of the antenna pointing direction or for fully automatic antenna tracking of the target. Preferably, circularly polarized signals are radiated from and received by a single antenna such as a horn used to track the target. With this system, at least two signal modes are sampled in the antenna waveguide feed line and the detected mode signals are separately processed to provide tracking information.

With circular polarization, it is customary to employ the two lowest-order modes, the $TE_{11}$, or dominant, mode and the $TM_{01}$, first higher order, mode to indicate the antenna pointing error magnitude and direction. Since the $TE_{11}$ and the $TM_{01}$ radiation patterns resemble in form and function the "sum" and "difference" patterns, respectively, for conventional monopulse tracking systems, the designation "sum" for $TE_{11}$ and "difference" for $TM_{01}$ mode signals will be used in the following discussion. Whenever the signal source or target is off the antenna boresight axis, the difference mode is excited. Since the difference mode is not excited when the signal source lies on the boresight axis, the resulting null in the difference mode provides the basis for target tracking. However, in order for this difference mode characteristics to be useful, it must be measured against a reference. The dominant mode signal serves this purpose. Its utility lies in two specific characteristics: it preserves the polarization on received plane waves, and its amplitude is maximum and nearly independent of pointing error when the error is small.

By utilizing a single, circularly symmetric difference signal and comparing it with two orthogonal linearly polarized components of th sum signal, positive tracking is possible on elliptical signals of either sense of circular polarization and hence on signals of random polarization. A typical system of this sort is described in an article entitled "The Autotrack System" by J. S. Cook and R. Lowell in the Bell System Technical Journal for July 1963, part II, page 1283. Tracking with this signal processing arrangement, presupposes, of course, an active return signal of elliptical polarization. With reflections from a passive target, there is no guarantee that received signals will be polarized such as to yield usable components; linear polarization may occur. Thus, unless special precaution is taken, polarization changes of received signals, occasioned by reflection irregularities or the like, so alter the recovered signals that insufficient data is received to assure positive tracking. For a signal which is linearly polarized, a pointing error orthogonal to the plane of polarization will not excite radially-symmetric electric fields in the antenna aperture. Hence, the difference mode will not be excited and no error indication will be generated. Whereas for circular polarization the difference pattern has a null point on the antenna axis, for linear polarization, there is, consequently, a plane orthogonal to the polarization direction for which the difference mode is not excited. This property limits the tracking capabilities for such a system to sources which reflect or generate circular or elliptical signals.

Although sensitive to signals of either polarization sense, a circularly polarized sum and difference system fails when supplied with the degenerate combination of two phase-coherent signals of opposite polarity sense and equal amplitudes. In tracking an active satellite, one that generates its own identifying signal, this eventuality is unlikely since the signal radiated by the satellite experiences only slight polarization rotation during transmission, but in tracking a passive satellite or missile, or in general any passive target, polarization distortion of the returned signal is the rule rather than the exeception so that tracking difficulties may be encountered.

These shortcomings are overcome in the present invention by sampling an additional higher order difference mode signal, for example, the $TE_{01}$ mode, which is maximally excited in the error planes for which the $TM_{01}$ difference mode is lost. The difference modes are selected such that the degenerate points are orthogonal in space and never coincide. One of the two thus always gives rise to sufficient tracking information. According to the invention, each of two difference mode signals is individually analyzed with two orthogonal polarizations of the dominant mode signal in essentially parallel channels. The tracking error signals developed in the two channels are combined at the output such that one or the other is always present. If both are simultaneously present they necessarily agree. Consequently, regardless of changes in the polarization of a received signal, sufficient tracking information is developed to generate angle error voltages. The system thus track any source, active or passive, regardless of the polarization of the received signal.

The invention will be fully apprehended from the following detailed description of an illustrative embodiment thereof taken in connection with the appended drawings, in which:

FIG. 3 is a schematic illustration of a sampling coupler suitable for use in the apparatus of FIG. 1; and FIG. 4 illustrates a section of circular waveguide loaded to inhibit the passage of unwanted higher order modes.

Figure 1:
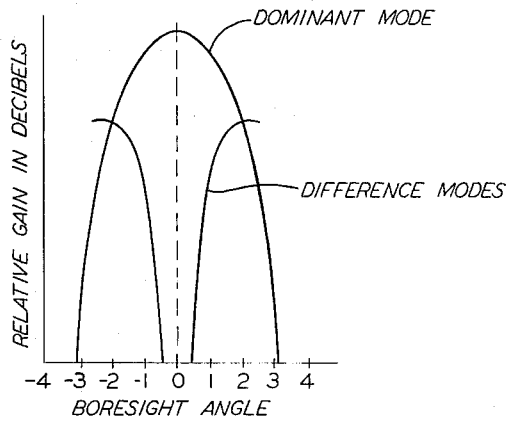
FIG. 1 illustrates typical sum and difference radiation patterns for an open-end circular waveguide antenna.

For automatic tracking of a target, it is sufficient that the radar apparatus deliver a signal that is of zero magnitude for a target on the antenna axis, a signal that is of one time phase when the target is off axis in one direction, and of a magnitude proportional to the departure from it and, a signal that is of the opposite phase when the target is off the axis in the opposite direction. FIG. 1 illustrates typical radiation patterns for an open-ended circular waveguide antenna for the dominant and difference modes which illustrates the manner in which these modes meet this requirement. A difference mode signal passes through a null on the antenna axis and increases in magnitude, with opposite relative phase relationship for angles away from the axis in either direction.

In accordance with the present invention, the $TE_{11}$ mode is utilized as the reference or dominant mode, against which two difference modes, the $TM_{01}$ and the $TE_{01}$ circularly polarized modes, are measured.

Figure 2:
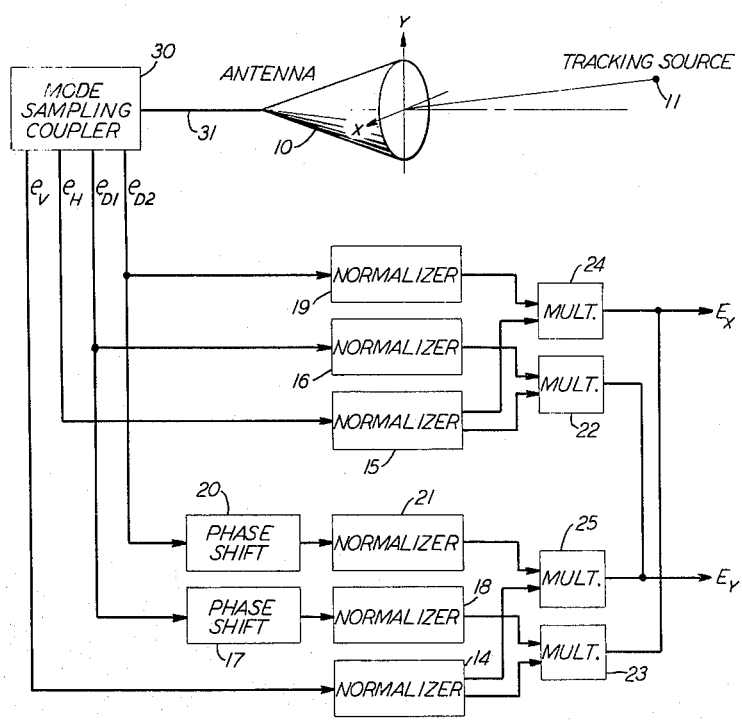
FIG. 2 is a block schematic diagram of an automatic tracking radar system in accordance with the present invention.

FIG. 2 illustrates an automatic tracking system in accordance with the present invention. A horn antenna 10 gathers circularly polarized CW signals from a tracking source 11. In this instance 11 is an active source such as a satellite which generates a fixed frequency tracking signal of arbitrary polarization. The source may, of course, also be a passive source such as a radar target which reflects signals generated at the tracking location. Suitable duplexor equipment placed, for example, in waveguide 31 which couples antenna 10 to sampling coupler 30 is ordinarily employed in radar applications, to permit horn antenna 10 also to be used for transmitting. The duplexor protects coupler 30 from transmitted energy. In the present discussion, however, antenna 10 is assumed merely to collect the signal radiated from the source.

Sampling coupler 30 functions to sample separately the two higher order difference modes and the orthogonally, e.g., vertically and horizontally, polarized dominant modes excited in antenna and transported to it by circular waveguide 31. It is well known that there is a series of axially symmetric higher order modes of propagation in a circular waveguide. They may be transverse-electric or transverse-magnetic modes belonging to the class $TE_{on}$ or $TM_{om}$. Radiation of these modes from an open-ended guide must be zero along the projection of the waveguide axis because of the balanced nature of the fields as they appear at the guide opening. Such a center-zero radiation pattern is used in the present invention as a source of pointing error information.

In a typical example, coupler 30 is arranged to deliver at one of its outputs the horizontal component of the $TE_{11}$ dominant mode, at a second of its outputs the vertical component of the dominant mode, at a third of its outputs the $TM_{01}$ difference mode, and at a fourth output the $TE_{01}$ difference mode. A suitable sampling coupler for providing the required signals is shown in FIG. 3 It will be described fully hereinafter. The vertical and horizontal components of the dominant mode signal, designated for convenience the $e_V$ and $e_H$ signals, constitute the sum or reference mode signals. The $TM_{01}$ and $TE_{01}$ signals, designated the $e_{D1}$ and $e_{D2}$ signals, constitute the difference mode signals.

Processing of the sum and difference signals to produce error signals proportional to the horizontal and vertical pointing errors takes place in two essentially parallel networks each consisting of three channels, one sum and two difference as shown in FIG. 2. Common amplitude variations such as path loss effects are first removed from all signals, sum and difference, by normalization, and the normalized signals are then phase compared, for example, by multiplication, to develop control signals. Thus, the orthogonal polarizations of the dominant mode, $e_V$ and $e_H$ each feed a sum channel. Vertical sum signal $e_V$ is supplied to normalizer 14 and horizontal sum signal $e_H$ is supplied to normalizer 15. Difference signal $e_{D1}$ is supplied directly to normalizer 16 in one channel and by way of phase shifter 17 to normalizer 18 in the other. Difference signal $e_{D2}$ is supplied directly to normalizer 19 in one channel and by way of phase shifter 20 to normalizer 21 in the other. Phase shifters 17 and 20 are employed to assure that orthogonally phased differences of the $e_{D1}$ and $e_{D2}$ signals appear in each of the two channels. A simple $\pi/2$ phase shifter of any form well known in the art may be used. The several normalization networks may be automatic gain controlled (AGC) amplifiers or the like, and each may include, typically, a frequency converter and an intermediate frequency amplifier. Applied signals are normalized in each network with respect to the sum signal, preferably by the factor $$e_n = \frac{A}{|e_V| + |e_H|}$$

Here, constant A is related to the gain of the amplifiers in the individual networks. The required normalizing factor $e_n$ is developed by suitable AGC circuitry in $e_V$ and $e_H$ amplifiers included in the normalizers.

The resulting normalized difference signals are then phase compared, or multiplied, with the normalized sum signal in each channel to develop an error signal. Normalized $e_{D1}$ which appears at the output of normalizer 16 is thus supplied to multiplier 22 together with the normalized $e_H$ signal from normalizer 15. One error signal component, $E_y$, is produced at the output of multiplier 22. The other component of $e_{D1}$ which appears at the output of normalizer 18 is supplied to multiplier 23 together with the normalized $e_V$ signal from normalizer 14. The resultant signal at the output of multiplier 23 constitutes the required $E_x$ error signal. Similarly, one phase component of the $e_{D2}$ signal normalized in 19 is supplied to multiplier 24 together with the $e_H$ signal from normalizer 15 to produce the $E_x$ error signal and the phase shifted component of $e_{D2}$ supplied at the output of normalizer 21 is supplied to multiplier 25 together with the normalized $e_V$ from normalizer 14 to produce the required $E_y$ signal. The desired signals developed at the outputs of the multipliers are, of course, D.C. signals. They may, if desired, be passed through low pass filters (not shown) to remove unwanted RF components. It is essential that the difference signal information not be combined until after phase comparison. If the combination takes place at IF or, in general, at A.C., polarization degeneracy can occur in processing. The $E_x$ components from filters 26 and 29 are added together, and the $E_y$ components from filters 27 and 28 similarly are added together. These signals may be employed, via suitable servo apparatus, to control the pointing direction of antenna 10.

As noted before, the fundamental problem with sampling only one axial mode comes from the fact that the sampled mode may not be excited if the tracking signal is linearly polarized in the wrong direction, even though there is a pointing error. With the arrangement of the present invention, however, a linearly polarized signal of either direction is fully processed to develop the error pointing signals. That is to say, an error signal, arising from an off axis target, of either linear polarization is processed in one of the two processing networks so that there is always an output error signal pair.

FIG. 3 illustrates in rudimentary form a suitable sampling coupler that may be used in the practice of the invention, e.g., at 30 in FIG. 2. The coupler takes advantage of the particular symmetry of the circular waveguide modes to separate them from one another. Coupler assembly 43 relies on the existence of a circumferential magnetic field on the cylinder walls for both $TE_{11}$ and $TM_{01}$ modes; at the upper and lower surfaces for the vertically polarized dominant mode, and all the way around for the $TM_{01}$ mode. Consequently, both modes are magnetically coupled through the same holes and are separated after coupling. The magnetic fields for the dominant modes are oppositely directed on opposite guide walls, e.g., clockwise on top and counterclockwise on the bottom. By contrast, the difference mode magnetic fields are continuous around the guide circumference. If balanced signals are coupled from holes on opposite sides of a guide and combined in a hybrid junction through a balanced filter and waveguide system, symmetry requires that energy carried by the appropriate dominant mode and that carried by the difference mode will be separated in the hybrid.

Since the dominant mode components are geometrically orthogonal, they must be separately sampled using orthogonal sets of coupling holes. In this instance the coupling holes in assembly 44 are orthogonally oriented so that axial components of the magnetic field adjacent the circular waveguide wall are sampled. Since the $TE_{11}$ mode is characterized by axial magnetic fields in the plane normal to its polarization, the horizontally polarized dominant mode couples to assembly 44. The $TE_{01}$ mode is also characterized by axial magnetic fields adjacent the guide walls, and couples into assembly 44. The horizontally polarized dominant mode and $TE_{01}$ difference mode are separated in hybrid 34 in a manner substantially similar to the separation at the vertically polarized dominant mode and $TM_{01}$ difference mode in hybrid 39.

Accordingly, signals entering circular waveguide section 31 from horn antenna 10 are coupled through holes in the opposite sides of the guide into filter sections 32, and 33 which terminate in hybrid 34. The horizontal component of the dominant mode signal ($TE_{11}$) is developed in waveguide section 35 coupled to the hybrid. The difference mode signal $TE_{01}$ is supplied in waveguide section 36. Signals in waveguide 31 that travel along the guide are coupled at opposite sides of the guide into filter sections 37 and 38 which feed hybrid network 39. The vertical component of the dominant mode signal $TE_{11}$ appears in waveguide section 40 coupled to the hybrid, and the difference mode signal $TM_{01}$ is developed in waveguide section 41 coupled to the hybrid. The factors affecting the exact placement, length, and arrangement of the filter sections and hybrid networks must, of course, be worked out to suit the particular system. As is well known by those skilled in the art, the arrangement selected is dependent largely on the exact system frequency and requirements. Suffice it to say that the filters shown in FIG. 3 are tuned to maximize the coupling of signals at the tracking source frequency, and to reject other frequencies such as those of a communication signal which may also be present in guide 31. In the instant scheme, the dielectric loading in 51 should be terminated at a point to maximize the magnetic field associated with the $TE_{01}$ mode at the plane of the coupling holes. Similarly, a change in waveguide diameter, by means of taper section 45, to cut off the $TM_{01}$ mode may be placed such a distance from coupling section 43 as to maximize the magnetic field associated with the $TM_{01}$ mode at the plane of the coupling holes. The dominant mode in guide 31 should not be affected by the taper. In the case of a radar system, strong coupling of both dominant and difference modes may, in addition, be achieved by placing a short circuit in waveguide 31 beyond taper 45 at such a position as to maximize the magnetic field associated with the dominant mode at both coupling hole planes.

Suitable detectors are incorporated in waveguide sections 35, 36, 40, and 41 to supply the mode signals to the processing channels (FIG. 2), for example, by means of coaxial cables or the like. Waveguide 31 may be terminated (as required) if tracking data only is of interest, but other signals, e.g., communication signals, may, if present, be transported via the guide to a suitable communications receiver.

A circular waveguide section that passes the $TE_{01}$ mode also passes two unwanted higher order modes. This difficulty is alleviated in the present invention by selectively loading waveguide 31. Accordingly, an annular dielectric cylinder 51 is positioned coaxially with circular waveguide 31 to prevent propagation of the unwanted higher order modes. The dielectric cylinder is preferably about half the waveguide diameter as shown in the cross-section of FIG. 4. Satisfactory loading is obtained by utilizing suitable low loss-tangent, medium dielectric-constant material. It may be formed in any convenient manner so long as the dielectric constant is sufficiently high, and may be mounted in the guide using conventional techniques. With loading of this sort, a smaller waveguide cylinder may be used to pass the $TE_{01}$ mode only. The loaded guide removes the higher order unwanted modes, but perturbs the dominant and $TM_{01}$ modes only slightly. Preferably, the dielectric cylinder 51 is placed coaxial with waveguide 31 from the point at which horn 10 joins the guide to a point just beyond the take-off points for coupling section 44 which supplies the $TE_{01}$ mode signal.

With the arrangement described above, directional pointing error signals are developed which are near optimum for precision tracking. If desired, however, additional normalization and mixing to compensate for polarization errors and phase shift discrepancies may be employed. Further, the specific higher order difference signal mode employed to supply the additional information to permit tracking of signals of arbitrary polarization may be determined by those skilled in the art in accordance with exact system requirements. Thus, the above-described arrangement is merely illustrative of the application of the principles of the invention. Other arrangements may be devised by those skilled in the art without departing from the spirit and scope of the invention.

What is claimed is:

1. A system for determining the position of the source of a signal of arbitrary polarization comprising, in combination, a directional antenna system including a single electromagnetic wave element receptively excitable in at least two orthogonally polarized dominant modes of propagation and at least two secondary modes of propagation, means for developing a signal representative of the energy received in said wave element in each one of said modes of propagation, means for comparing the phase and amplitude of each of said signals representative of said secondary modes respectively with the phase and amplitude of each one of said signals representative of said dominant modes, and means for utilizing signals developed by said comparison as an indication of the position of said source of incoming energy with respect to said antenna system.

2. A system as defined in claim 1 wherein said dominant mode is of the $TE°_{11}$ type.

3. A system as defined in claim 1 wherein said dominant mode is of the $TE°_{11}$ type and said secondary modes are of the $TM°_{01}$ and the $TE°_{01}$ types.

4. A system for determining the position of a source of incoming radio frequency energy comprising, in combination, a directional antenna system, an electromagnetic wave element receptively excitable in at least two orthogonally polarized dominant modes of propagation and at least two reception lobes of secondary modes of propagation coupled to said antenna system, means for developing a signal representative of the energy received in said wave element in each one of said reception lobes, means for comparing the phase of each of said signals representative of reception lobes of secondary modes respectively with the phase of each one of said reception lobes of said dominant mode, and means for utilizing phase differences between selected pairs of said lobe representative signals as an indication of the position of said source of incoming energy.

5. A tracking system of the simultaneous lobe comparison type which comprises means for receiving a signal of arbitrary polarization in a waveguide, means for sampling said signal to develop therefrom a pair of quadrature component signals of a dominant waveguide mode and signals excited in at least two higher order waveguide modes, means for respectively comparing each of said higher order mode signals with each of said quadrature signal components to develop product signals, and means for selectively combining said product signals to develop a pair of error signals that represent the direction of reception of said arbitrarily polarized signal with respect to said system.

6. A tracking system of the simultaneous lobe comparison type which comprises means for receiving a signal of arbitrary polarization in a waveguide, means for sampling said signal to develop therefrom a pair of quadrature component signals of a dominant waveguide mode and signals excited in at least two higher order waveguide modes, means for individually normalizing said quadrature component signals and said two higher order mode signals with respect to each of said quadrature components, means for respectively comparing each of said normalized higher order mode signals with each of said normalized quadrature signal components to develop product signals, and means for selectively combining said product signals to develop a pair of error signals that represent the direction of reception of said arbitrarily polarized signal with respect to said system.

7. A tracking system of the simultaneous lobe comparison type which comprises means for receiving a signal of arbitrary polarization from a target signal source, means including a waveguide system for sampling said signal to develop therefrom a pair of quadrature component signals of a dominant waveguide mode and signals excited in at least two higher order waveguide modes, means for individually normalizing said quadrature component signals and said two higher order mode signals with respect to each of said quadrature components, means for respectively phase comparing each of said normalized higher order mode signals with each of said normalized quadrature signal components to develop product signals, and means for selectively combining said product signals to develop a pair of error signals that represent the bearing of said target with respect to said system.

8. A microwave receiving system which comprises means for receiving an arbitrarily polarized signal in at least four waveguide channels according, respectively, to a different one of the modes of propagation excited by said signal in a circular waveguide, means for developing signals proportional respectively to the product of each of the quadrature components of a dominant mode signal developed in each of two of said channels and each of two difference mode signals developed individually in two others of said channels, and means for selectively combining said product signals to develop a pair of signals indicative of the direction of reception of said arbitrarily polarized signal with respect to said system.

9. A microwave receiving system as defined in claim 8 wherein said dominant mode signal is of the $TE°_{11}$ type.

10. A microwave receiving system as defined in claim 9 wherein said two difference mode signals are of the $TM°_{01}$ and the $TE°_{01}$ types.

11. A multimode tracking system which includes means for receiving an arbitrarily polarized signal, means including a pair of balanced waveguide filters for developing individual signals representative, respectively, of a number of different modes of propagation excited by said signal in a waveguide, means for developing signals proportional respectively to the product of each of the quadrature components of a dominant mode signal and each of two difference mode signals developed individually in said waveguide filters, and means for selectively combining said product signals to develop a pair of signals indicative of the direction of reception of said arbitrarily polarized signal with respect to said system.

12. A tracking system of the simultaneous lobe comparison type which comprises, means for receiving a signal of arbitrary polarization in at least four waveguide channels according to different modes of propagation of said signal, means for developing from signals in the first and second of said channels a pair of quadrature component signals of a dominant waveguide mode, means for developing from said signals in a third of said channels a signal excited in a first higher order waveguide mode, means for developing from signals in a fourth of said channels a signal excited in a second higher order waveguide mode, means for developing from said first higher order mode signal a pair of signals which differ from one another in phase by a prescribed phase shift, means for developing from said second higher order mode signal a pair of signals which differ from one another in phase by a prescribed phase shift, means for comparing the phase of each one of said pairs of higher order mode signals with each of said quadrature signal components to develop product signals, and means for selectively combining said product signals to develop a pair of error signals that denote the direction of reception of said arbitrarily polarized signal with respect to said tracking system.

13. A tracking system of the simultaneous lobe comparison type which comprises, means for receiving a signal of arbitrary polarization in at least four waveguide channels according to different modes of propagation of said signal, means for developing from signals in the first and second of said channels a pair of quadrature component signals of a dominant waveguide mode, means for developing from said signals in a third of said channels a signal excited in a first higher order waveguide mode, means for developing from signals in a fourth of said channels a signal excited in a second higher order waveguide mode, means for individually normalizing said quadrature components signals with respect to the sum of the absolute values of said quadrature component signals, means for developing from said first higher order mode signal a pair of signals which differ from one another in phase by a prescribed phase shift, means for individually normalizing each of said last-named pair of signals with respect to the sum of the absolute values of said quadrature component signals, means for developing from said second higher order mode signal a pair of signals which differ from one another in phase by a prescribed phase shift, means for individually normalizing each of said last-named pair of signals with respect to the sum of the absolute values of said quadrature component signals, means for comparing the phase of each one of said pairs of normalized higher order mode signals with each of said normalized quadrature signal components to develop product signals, and means for selectively combining said product signals to develop a pair of error signals that denote the direction of reception of said arbitrarily polarized signal with respect to said tracking system.

14. A waveguide mode coupling section which comprises a circular waveguide section transporting arbitrarily polarized electromagnetic signals, a first waveguide hybrid network, a first balanced wave filter coupled to said circular waveguide via elongated holes on opposite sides and aligned with the axis of said circular waveguide for coupling one of two orthogonal components of the dominant mode and a first higher order mode excited in said waveguide to first and second input ports in said first hybrid network, a second waveguide hybrid network, a second balanced wave filter coupled to said circular waveguide via elongated holes on opposite sides and aligned substantially normal to the axis of said circular waveguide for coupling the second of said two orthogonal components of the dominant mode and a second higher order mode excited in said waveguide to first and second input ports in said second hybrid network, and means including a substantially cylindrical dielectric member coaxially mounted in said circular waveguide in proximity to said first balanced filter.

15. A waveguide mode coupling section which comprises a circular waveguide transporting arbitrarily polarized electromagnetic signals, a first waveguide hybrid network having a pair of input ports and a pair of output ports, a first balanced wave filter coupled to said circular waveguide for coupling one of two orthogonal components of the dominant mode and a first higher order mode excited in said waveguide respectively to said pair of input ports in said first hybrid network, a second waveguide hybrid network having a pair of input ports and a pair of output ports, a second balanced wave filter coupled to said circular waveguide for coupling the second of said two orthogonal components of the dominant mode and a second higher order mode excited in said waveguide respectively to said pair of input ports in said second hybrid network, means including a substantially cylindrical dielectric member coaxially mounted in said circular waveguide in proximity to said first balanced filter, and means associated with each one of the output ports of said first and said second hybrid networks for conveying the single mode signal appearing therein to a utilization device.

No references cited.

CHESTER L. JUSTUS, *Primary Examiner*.

R. E. BERGER, *Assistant Examiner*.